(12) United States Patent
Nakasone

(10) Patent No.: US 11,377,884 B2
(45) Date of Patent: Jul. 5, 2022

(54) LOCK DEVICE

(71) Applicant: PIOLAX, INC., Yokohama (JP)

(72) Inventor: Hisashi Nakasone, Yokohama (JP)

(73) Assignee: PIOLAX, INC., Yokohama (JP)

( * ) Notice: Subject to any disclaimer, the term of this patent is extended or adjusted under 35 U.S.C. 154(b) by 867 days.

(21) Appl. No.: 16/311,734

(22) PCT Filed: Jul. 3, 2017

(86) PCT No.: PCT/JP2017/024371
§ 371 (c)(1),
(2) Date: Dec. 20, 2018

(87) PCT Pub. No.: WO2018/008597
PCT Pub. Date: Jan. 11, 2018

(65) Prior Publication Data
US 2020/0308881 A1  Oct. 1, 2020

(30) Foreign Application Priority Data

Jul. 8, 2016 (JP) .............................. JP2016-136147

(51) Int. Cl.
*E05B 83/30* (2014.01)
*E05C 9/04* (2006.01)

(52) U.S. Cl.
CPC ................ *E05B 83/30* (2013.01); *E05C 9/04* (2013.01)

(58) Field of Classification Search
CPC .............. E05B 83/30; E05C 9/04; B60R 7/06
(Continued)

(56) References Cited

U.S. PATENT DOCUMENTS 7,048,311 B2 * 5/2006 Sawatani ................ E05B 83/30
                                                                        292/32
9,556,654 B2 * 1/2017 Fukumoto ............... E05B 83/28
(Continued)

FOREIGN PATENT DOCUMENTS

JP  2011-247084 A   12/2011
WO  WO-2013018496 A1 *  2/2013 ............. E05B 13/10
(Continued)

OTHER PUBLICATIONS

International Search Report (ISR) (PCT Form PCT/ISA/210), in PCT/JP2017/024371, dated Sep. 12, 2017, and English translation thereof.
(Continued)

*Primary Examiner* — Pinel E Romain
(74) *Attorney, Agent, or Firm* — McGinn IP Law Group, PLLC

(57) ABSTRACT

A lock device includes a base member fixed on an opening/closing member, an operation member rotatably supported on the base member, and a rod configured to move forward and backward to be engaged with and disengaged from a locked portion of the fixed member in response to operation of the operation member. The operation member includes a pivot portion and a transmission portion. The base member includes a first attachment portion and a second attachment portion. When the transmission portion presses an inclined surface of the rod and thus causes the rod to move backward, the first attachment portion abuts against the rod, thereby limiting movement of the rod in the direction intersecting with the forward and backward movement direction of the rod.

3 Claims, 8 Drawing Sheets

(58) Field of Classification Search
USPC .................................................... 296/24.34
See application file for complete search history.

(56) References Cited

U.S. PATENT DOCUMENTS

| | | |
|---|---|---|
| 2006/0055196 A1 | 3/2006 | Yamada |
| 2015/0028602 A1 | 1/2015 | Shimizu et al. |
| 2017/0009496 A1 | 1/2017 | Nakasone |
| 2017/0009497 A1 | 1/2017 | Nakasone |
| 2018/0251075 A1* | 9/2018 | Harima .................. E05B 79/06 |
| 2018/0340360 A1* | 11/2018 | Nakasone ............... E05C 9/043 |

FOREIGN PATENT DOCUMENTS

| | | |
|---|---|---|
| WO | WO 2013/129100 A1 | 9/2013 |
| WO | WO 2015/122447 A1 | 8/2015 |
| WO | WO 2015/125774 A1 | 8/2015 |

OTHER PUBLICATIONS

Written Opinion of the International Searching Authority (PCT Form PCT/ISA/237), in PCT/JP2017/024371, dated Sep. 12, 2017.

\* cited by examiner

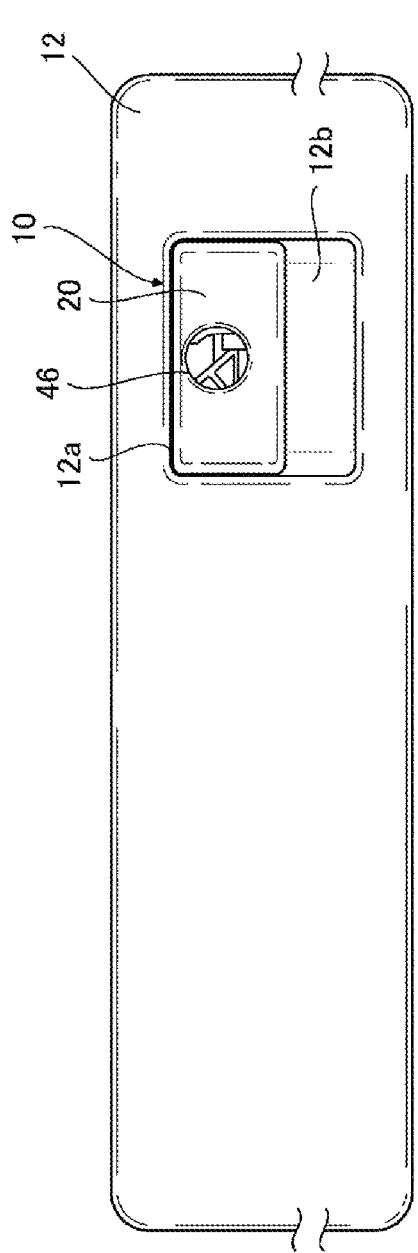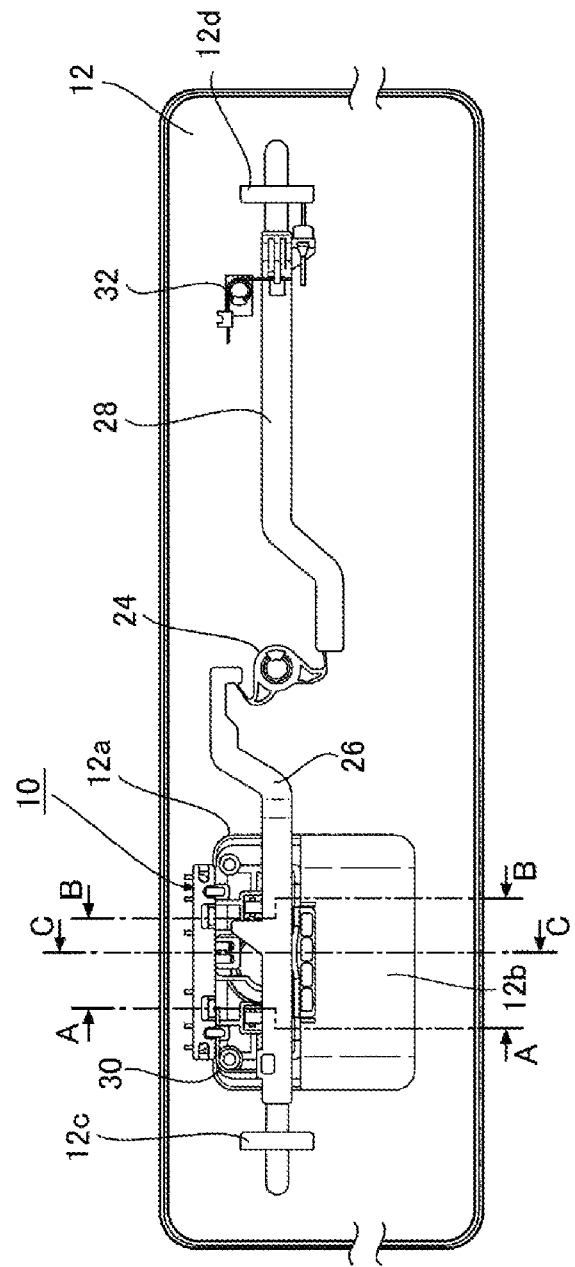

LOCK DEVICE

TECHNICAL FIELD

The present invention relates to a lock device configured to be attached to an opening/closing member.

BACKGROUND ART

On an opening/closing member for opening and closing an opening of a glove box of vehicles, a lock device is attached to hold the opening/closing member in a closed state. A user can open the glove box by operating an operation member of the lock device to unlock the lock device.

A lock device for an opening/closing member as disclosed in Patent Document 1 includes a base member fixed on an mounting seat surface of an opening/closing member, an operation member pivotally supported on the base member, a drive member pivotally supported on the base member and configured to rotate in response to operation of the operation member, and a lock member configured to be positioned at a locked position or an unlocked position in response to driving of the drive member. The base member is fixed to the opening/closing member with a plurality of screw members.

PRIOR ART DOCUMENT

Patent Document

Patent Document 1: International Patent Application Publication No. WO2015/122447

SUMMARY OF INVENTION

Problems to be Solved by Invention

In the technique disclosed in Patent Document 1, the base member is fixed to the opening/closing member with the screw members, thereby making the attaching operation complex. If the base member is configured to be hooked and attached to an edge of an attaching hole of the opening/closing member or the like instead of using the screw members, the attaching operation can be easily performed. However, there is a risk that a load-bearing property is reduced as compared with fixation using the screw members.

The present invention has been made keeping in mind the above problems, and an object thereof is to provide a lock device, which can be easily attached to an opening/closing member and is configured to inhibit reduction of a load-bearing property thereof.

Means for Solving Problems

In order to solve the above object, a lock device according to one aspect of the present invention is a lock device for holding an opening/closing member in a locked state, the opening/closing member attached to an opening portion of a fixed member in an openable and closable manner, the lock device comprising: a base member fixed on the opening/closing member; an operation member rotatably supported on the base member; and a rod configured to move forward and backward to be engaged with and disengaged from a locked portion of the fixed member in response to operation of the operation member. The operation member comprises: a pivot portion pivotally supported on the base member; and a transmission portion configured to move in a direction intersecting with a forward and backward movement direction of the rod in response to rotation of the operation member. The rod has an inclined surface inclined with respect to the forward and backward movement direction of the rod and configured to abut against the transmission portion. The base member comprises: a first attachment portion formed into a hook shape and configured to be hooked on an attaching edge portion provided on the opening/closing member; and a second attachment portion configured to be attached to the opening/closing member. The first attachment portion is arranged to be in contact with or close to a side surface of the rod. When the transmission portion presses the inclined surface due to operation of the operation member and thus causes the rod to move backward, the first attachment portion abuts against the rod, thereby limiting movement of the rod in the direction intersecting with the forward and backward movement direction of the rod.

Advantageous Effects of Invention

According to the present invention, a lock device can be provided, which can be easily attached to an opening/closing member and is configured to inhibit reduction of a load-bearing property thereof.

BRIEF DESCRIPTION OF DRAWINGS

FIGS. 1A and 1B are views explaining a lock device according to a first embodiment.

EMBODIMENTS OF INVENTION

Figure 2:
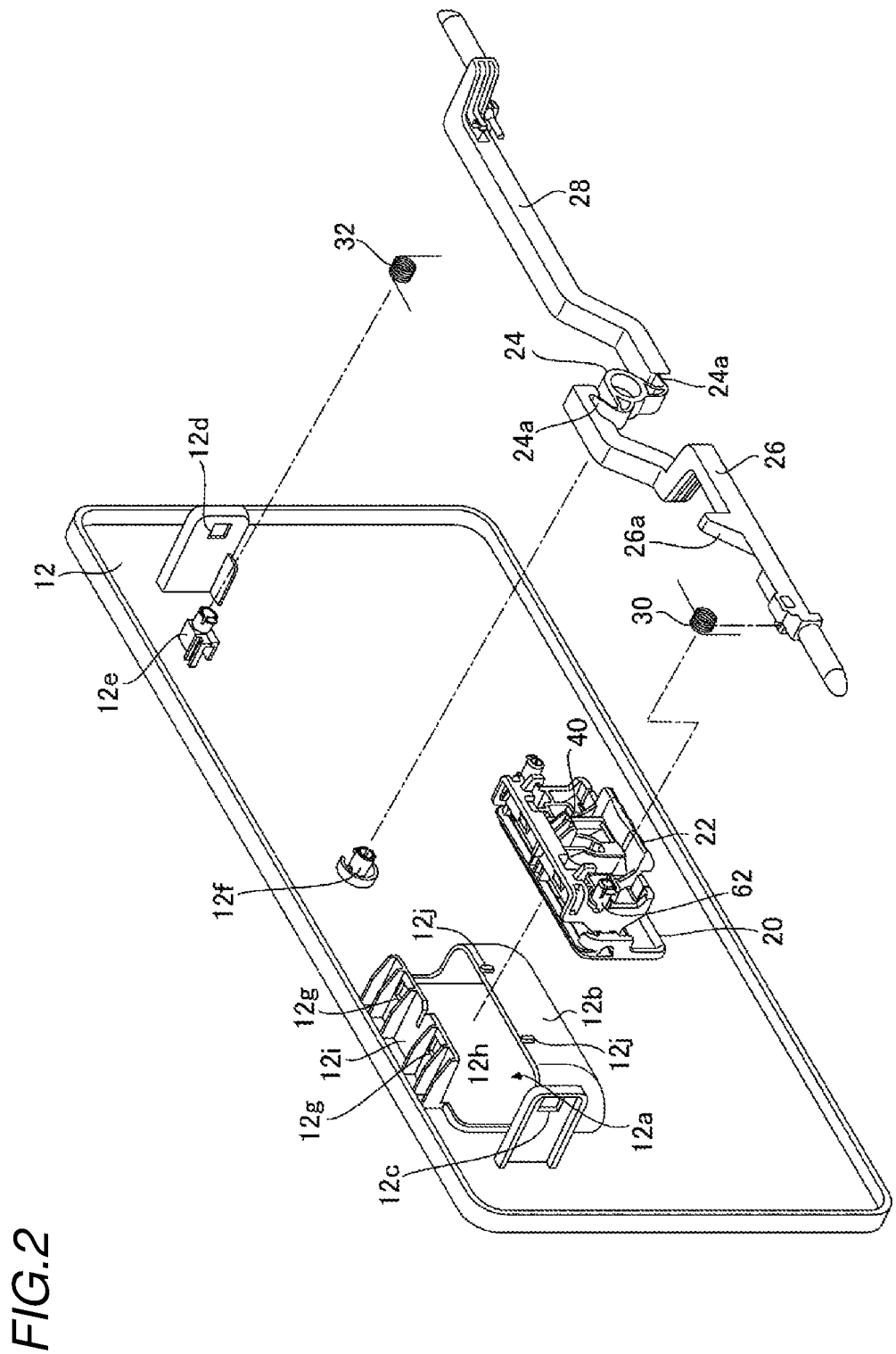
FIG. 2 is an exploded view of the lock device.

FIGS. 1A and 1B are views explaining a lock device 10 according to a first embodiment. FIG. 1A is a front view of the lock device 10 and an opening/closing member as viewed from a front of the opening/closing member, and FIG. 1B is a rear view of the lock device 10 and the opening/closing member as viewed from a rear of the opening/closing member. The opening/closing member is actually formed by two plate-shaped members bonded to each other so that the lock device 10 is received in an inside space thereof, but FIG. 1B shows the opening/closing member covering the lock device 10 while omitting an inner member on the back side thereof.

The opening/closing member is, for example, a lid member for a glove box of a vehicle and is constituted of an outer member 12 and an inner member. Although the outer member 12 of the opening/closing member in FIGS. 1A and 1B is shown in a flat surface shape for the convenience of explanation, the outer member 12 is actually formed to conform to a shape of an opening portion of the glove box and accordingly may be formed to be curved. In the present embodiment, the glove box is a fixed member having a recessed part, which is a storage space provided on an instrument panel, and the opening/closing member is pivotally attached to the glove box to open and close an opening portion of the recessed part. In the closed state of the opening/closing member, the outer member 12 is exposed in front of a front passenger seat, and the inner member is positioned inside the recessed part. Alternatively, the storage space may be provided in the opening/closing member so that the glove box itself functions as the opening/closing member. Also, the glove box may be configured to be rotated to open the storage space of the glove box.

The outer member 12 of the opening/closing member has an attaching hole 12a formed to allow the lock device 10 to be attached thereto. The lock device 10 attached to the opening/closing member is configured to lock the opening/closing member on the opening portion of the glove box and thus to hold the opening/closing member in the closed state. The lock device 10 of the present embodiment is a side type lock device, in which an operation member 20 is configured to be operated in a width direction of the opening/closing member.

The lock device 10 includes an operation member 20, a base member 22, a rotation member 24, a first rod 26, a second rod 28, a first spring member 30 and a second spring member 32. Meanwhile, in the actual lock device 10, a key cylinder is arranged in a key cylinder hole portion 46 of the operation member 20, but the key cylinder is omitted in FIG. 1A.

The lock device 10 is provided in a receiving space defined between the outer member 12 and the inner member of the opening/closing member. The base member 22 is fixed on the outer member 12. The operation member 20 is rotatably supported on the base member 22. As shown in FIG. 1A, the operation member 20 is exposed on a front side of the attaching hole 12a. A user can perform unlocking by inserting a finger to a back side of the operation member 20 through a recessed portion 12b and then pulling the operation member 20. The back side of the outer member 12 and the back side of the inner member are located in the receiving space for receiving the lock device 10, the front side of the outer member 12 and the front side of the inner member are located in an exposed outside space.

The rotation member 24 is rotatably supported on the outer member 12 and is connected to the first rod 26 and the second rod 28 (both simply referred to as a rod if distinction therebetween is not required). An operating force of the user is transmitted from the operation member 20 to the first rod 26 shown in FIG. 1B, then from the first rod 26 to the rotation member 24, and then from the rotation member 24 to the second rod 28. The rotation member 24 is configured to be rotated as the operation member 20 is rotated. The rods are configured to move forward and backward in a longitudinal direction thereof as the rotation member 24 is rotated. The rods can be engaged with and separated from lock holes of a fixed member in response to rotation of the operation member 20.

The first rod 26 is inserted in a first support hole portion 12c of the outer member 12, and the second rod 28 is inserted in a second support hole portion 12d of the outer member 12. If the back side of the lock device 10 is covered and concealed with the inner member of the opening/closing member, which is not shown in FIG. 1B, a distal end portion of the first rod 26 protrudes to the outside and also a distal end portion 28a of the second rod 28 protrudes to the outside. For the first rod 26 and the second rod 28, sides thereof to be inserted into a first lock hole and a second lock hole of the glove box are referred to as distal ends, and sides thereof connected to the rotation member 24 are referred to as base ends.

The first support hole portion 12c and the second support hole portion 12d of the outer member 12 are formed to extend through a wall portion protruding from the back surface of the outer member 12. On peripheral edges of through-holes of the first support hole portion 12c and the second support hole portion 12d, an elastic portion may be provided to be elastically in contact with the rods and to guide movement of the rods while inhibiting the rods from rattling.

If the user operates the operation member 20, the rotation member 24 is rotated via the first rod 26, and then in response to rotation of the rotation member 24, the rods enter and exit respectively the first lock hole and the second lock hole formed in the glove box, which is the fixed member. If the distal ends of the rods enter the lock holes of the glove box, the opening/closing member is brought into a locked state, whereas if the rods exit the lock holes, the opening/closing member is brought into an unlocked state. A direction, along which the rods enter the lock holes, is referred to as a forward movement direction of the rods, and a direction, along which the rods exits the lock holes, is referred to as a backward movement direction of the rods.

The first rod 26 is provided with a first spring member 30 for urging in the forward movement direction, and the second rod 28 is provided with a second spring member 32 for urging in the forward movement direction. Also, the operation member 20 may be provided with an additional spring member for urging the operation member 20 into the closed state.

FIG. 2 is an exploded view of the lock device 10. In FIG. 2, the outer member 12 of the opening/closing member is shown together with the lock device 10. The base member 22 shown in FIG. 2 is integrated with the operation member 20 and is attached on the attaching hole 12a of the outer member 12 while pivotally supporting the operation member 20.

As shown in FIG. 2, all the members of the lock device 10 can be attached from the back side of the outer member 12, thereby facilitating an attaching work thereof as compared with the case where an attaching direction has to be changed front or back depending on the members.

The rotation member 24, the first rod 26 and the second rod 28 are previously integrally formed by resin molding. The rotation member 24 is connected to the base end sides of the first rod 26 and the second rod 28 via a thin hinge portion 24a. Therefore, the number of attaching operations can be reduced. Further, the rotation member 24, the first rod 26 and the second rod 28, which are integrated with each other, can be held at three locations, including a rotor bearing portion 12f, the first support hole portion 12c and the second support hole portion 12. Therefore, rattling of the rods can be inhibited by such a simple configuration.

An operation of attaching the lock device 10 to the outer member 12 will be described. The base member 22 is attached on the attaching hole 12a from the back side of the outer member 12 while pivotally supporting the operation member 20. Then, the rotation member 24, the first rod 26 and the second rod 28 are integrally attached from the back side of the outer member 12. The rotation member 24 is pivotally supported on the rotor bearing portion 12f, the distal end of the first rod 26 is inserted in the first support hole portion 12c, and the distal end of the second rod 28 is inserted in the second support hole portion 12d. Then, the first spring member 30 is attached to a spring bearing portion 62 of the base member 22 to urge the first rod 26, and the second spring member 32 is attached to a spring holding portion 12e to urge the second rod 28. Then, attaching of the lock device 10 is completed. Alternatively, the first spring member 30 may be attached to the base member 22 before attaching the first rod 26 thereto.

In this way, all the members of the lock device 10 can be attached from the back side of the outer member 12. Therefore, if the outer member 12 is placed with the back side up on a pedestal during the attaching process, the lock device 10 and internal members of the opening/closing member can be attached thereto at it is and then the opening/closing member can be assembled, thereby facilitating the attaching operation. Each of the members of the lock device 10 will be described in detail with reference to new figures.

Figure 3:
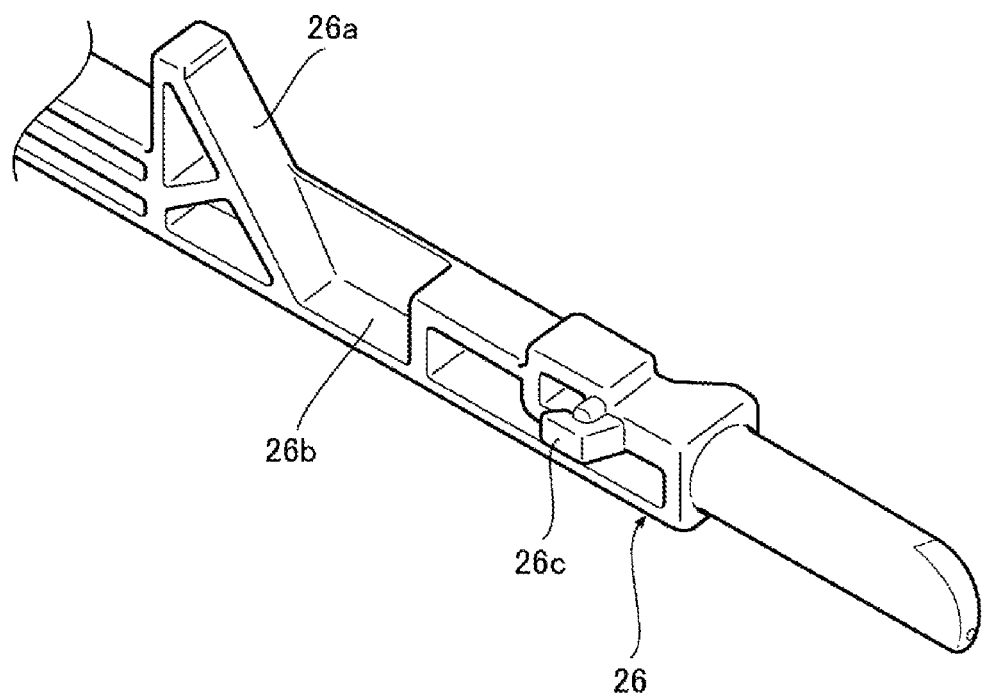
FIG. 3 is a partially perspective view of a first rod.

FIG. 3 is a perspective view of the first rod 26. The first rod 26 has an inclined surface 26a, a bearing surface 26b and a spring bearing portion 26c. The inclined surface 26a is arranged to be capable of abutting against a transmission portion 40 of the operation member 20 and thus to be pressed by the transmission portion 40 when the operation member 20 is operated. The inclined surface 26a is inclined with respect to the forward and backward movement direction of the first rod 26. Due to inclination of the inclined surface 26a, movement of the transmission portion 40 is changed to the forward and backward movement direction of the first rod 26, i.e., to a longitudinal direction of the first rod 26. If the inclined surface 26a is pressed downward by the transmission portion 40, the first rod 26 moves backward from the lock hole.

The bearing surface 26b is contiguous to the inclined surface 26a and extends along the forward and backward movement direction of the first rod 26. The transmission portion 40 stops by bumping against the bearding surface 26b when the transmission portion 40 moves downward to the maximum limit.

The spring bearing portion 26c is engaged with one end of the first spring member 30 and thus bears an urging force from the first spring member 30. Therefore, the first rod 26 is urged by the first rod 26 in a direction, in which the first rod 26 moves forward into the lock hole.

Figure 4:
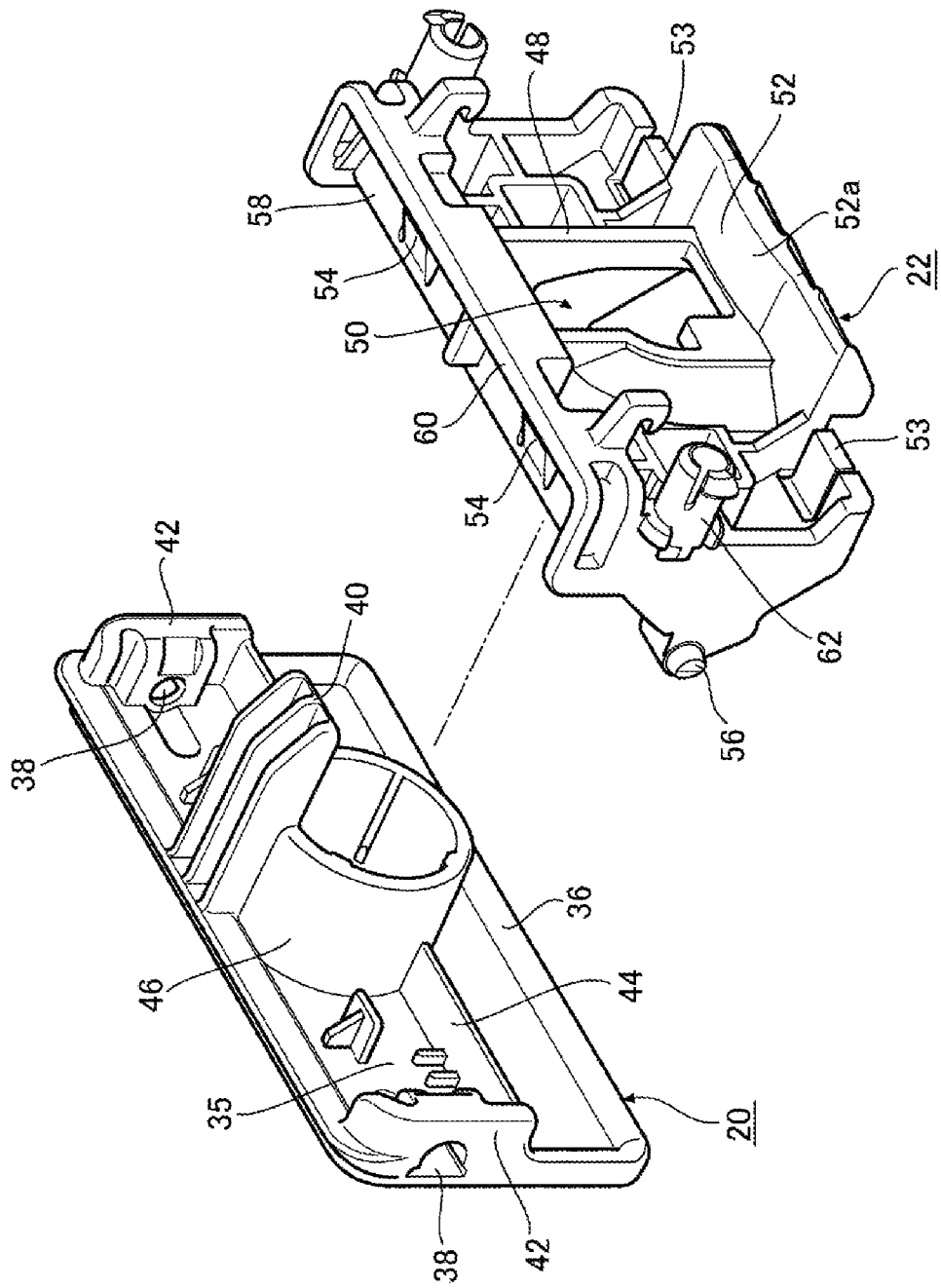
FIG. 4 is a perspective view of an operation member and a base member.

FIG. 4 is a perspective view of the operation member 20 and the base member 22. The operation member 20 has a base portion 35, an operating portion 36, a pair of shaft hole portion 38, the transmission portion 40, a pair of side wall portion 42, a middle wall portion 44 and a key cylinder hole portion 46.

The operating portion 36 is formed on the base portion 35 having a flat plate shape and is positioned on the front side of the outer member 12 to allow a finger of a user to be hooked thereon. The operating portion 36 is positioned below the base portion 35.

The pair of side wall portions 42 are erected on back surface of the base portion 35 to oppose each other. The pair of shaft hole portions 38 are respectively formed into a hole shape in the pair of side wall portions 42. The shaft hole portions 38 function as a pivot portion, in which respective shaft portions 56 of the base member 22 are received and pivotally supported. A rotation axis of the operation member 20 extends along a lateral direction and also along the forward and backward movement direction of the first rod 26.

The middle wall portion 44 is erected on the back surface of the base portion 35 and is connected to the pair of side wall portions 42. The middle wall portion 44 is configured to cover an internal structure of the lock device 10 and to prevent a finger of a user from entering inside the lock device 10.

The transmission portion 40 is formed into a column shape and is erected from the back surface of the base portion 35 to be inserted through the base member 22 as shown in FIG. 2. The transmission portion 40 is configured to be engaged with the inclined surface 26a of the first rod 26 and thus to transmit an operating force, which is exerted on the operation member 20, to the first rod 26. The transmission portion 40 moves up and down by operating the operation member 20.

The key cylinder hole portion 46 for attaching a key cylinder is formed to extend through the base portion 35. In an alternative embodiment, the key cylinder hole portion 46 may not be provided and thus the key cylinder may not be provided on the operation member 20.

The base member 22 has a base frame portion 48, an insertion portion 50, a hook portion 52, elastic claw portions 53, locking claw portions 54, shaft portions 56, an upper wall portion 58, a protruding portion 60 and a spring bearing portion 62. The insertion portion 50 is formed to extend through the base frame portion 48, thereby allowing the transmission portion 40 of the operation member 20 to be inserted therethrough from the back side. The shaft portions 46 are formed into a protrusion shape and are formed in a pair on both side surfaces of the base frame portion 48. The shaft portions 46 are configured to be inserted into the respective shaft hole portions 38 of the operation member 20 and thus to rotatably support the operation member 20.

The hook portion 52 is configured to be hooked on an attaching edge proton 12h on a back side of the recessed portion 12b and to prevent the base member 22 from being separated from the outer member 12 toward the front side thereof. The hook portion 52 is positioned at the middle portion of a lower end of the base member 22. In addition, the hook portion 52 is positioned between a pair of protrusions 12j formed on a back surface of the recessed portion 12b, so that a lateral movement thereof is limited. The hook portion 52 has a raised portion 52a formed to be raised and curved upward. Due to the raised portion 52a, an upper surface of the hook portion 52 can easily abut against the first rod 26 to guide forward and backward movement of the first rod 26.

A pair of elastic claw portions 53 are bendably formed on both sides of the hook portion 52 and are configured to be engaged with the attaching edge portion 12h on the front side of the recessed portion 12b and thus to prevent the base member 22 from being separated from the outer member 12 toward the back side thereof. When the base member 22 is attached to the outer member 12 from the back side thereof, the hook portion 52 is intactly hooked on the attaching edge portion 12h on the back side of the recessed portion 12b, and the elastic claw portions 53 are engaged with the attaching edge portion 12h of the recessed portion 12b after passing around the attaching edge portion 12h by bending and then being restored.

A pair of locking claw portions 54 are bendably formed on the upper wall portion 58 and are configured to be respectively engaged with edges of engaging holes 12g formed in an attaching wall portion 12i shown in FIG. 2 and thus to prevent the base member 22 from being separated from the outer member 12 toward the back side. On the other hand, the attaching wall portion 12i shown in FIG. 2 is positioned above the attaching hole 12a of the outer member 12 and is erected from the back surface of the outer member 12.

The protruding portion 60 is formed into a flange shape on an edge of the upper wall portion 58 to protrude upward. The protruding portion 60 abuts against a distal end of the attaching wall portion 12i, thereby preventing the base member 22 from being separated from the outer member 12 toward the front side thereof. When the base member 22 is attached to the outer member 12 from the back side thereof, the protruding portion 60 intactly abuts against the attaching wall portion 12i, and the locking claw portions 54 are locked in the engaging holes 12g after passing around the attaching wall portion 12i by bending and then being restored. The hook portion 52 and the elastic claw portions 53 function as a first attachment portion for attaching a lower portion of the base member 22, and the locking claws portions 54 and the protruding portion 60 function as a second attachment portion for attaching an upper portion of the base member 22.

The pair of shaft portions 56 are formed to protrude from both side surfaces of the base member 22. The shaft portions 56 are configured to be respectively inserted in the shaft hole portions 38 and thus to pivotally support the operation member 20. Meanwhile, although an aspect, in which the operation member 20 is provided with the shaft hole portions 38 and the base member 22 is provided with the shaft portions 56, is described in the present embodiment, the concave/convex relation between the shaft hole portions and the shaft portions may be reversed in an alternative embodiment. That is, in the alternative embodiment, protrusion-shaped shaft portions may be formed on the operation member 20, and also shaft hole portions allowing the shaft portions to be inserted therein may be formed in the base member 22. In any case, the base member 22 can rotatably support the operation member 20. The spring bearing portion 62 supports the first spring member 30.

Figure 5:
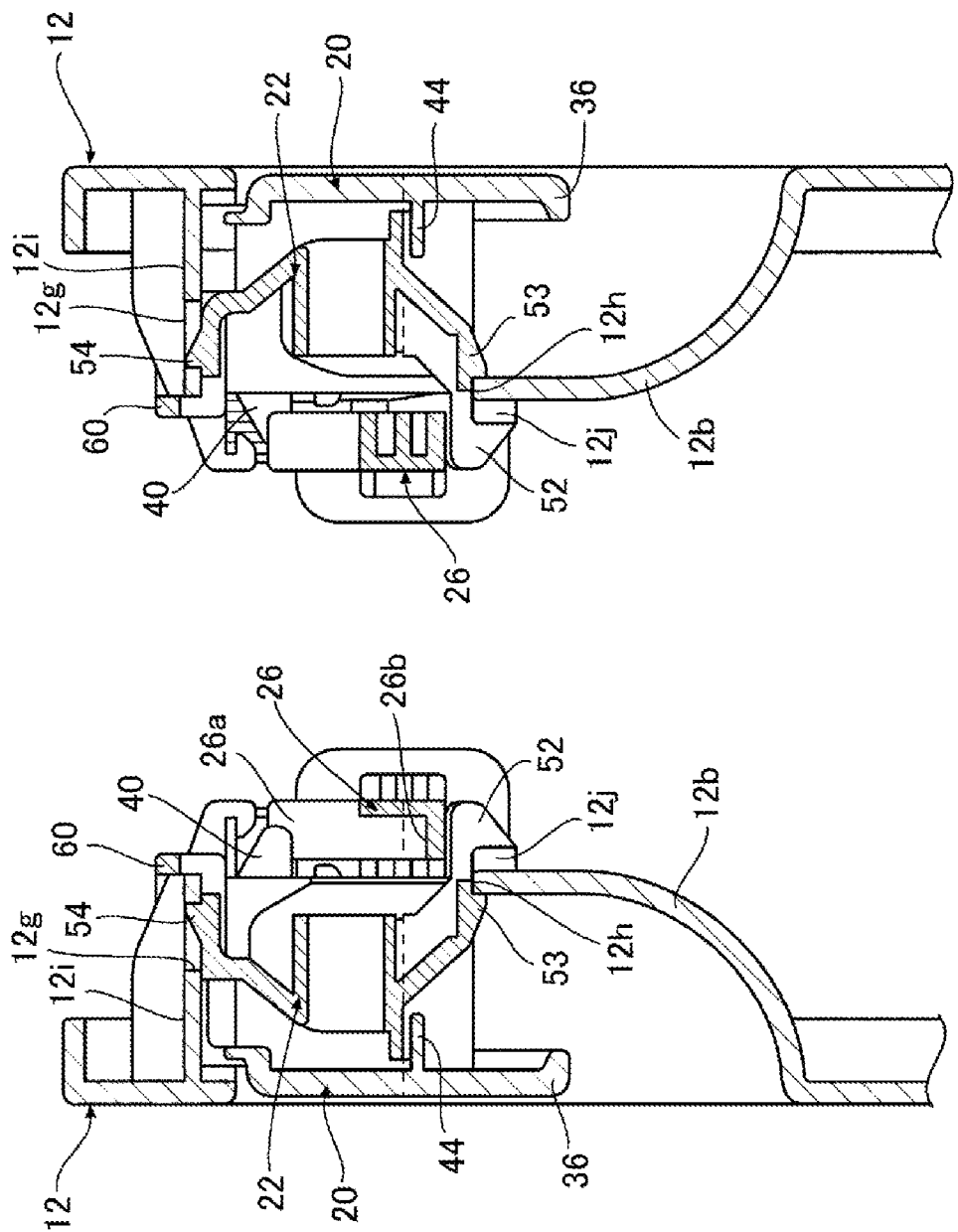
FIG. 5A is an A-A sectional view of the lock device and an outer member shown in FIG. 1B.
FIG. 5B is a B-B sectional view of the lock device and the outer member shown in FIG. 1B.

FIG. 5A is an A-A sectional view of the lock device 10 and the outer member 12 shown in FIG. 1B, and FIG. 5B is a B-B sectional view of the lock device 10 and the outer member 12 shown in FIG. 1B.

As shown in FIGS. 5A and 5B, on the upper side of the base member 22, the locking claw portions 54 are engaged with edges of the engaging holes 12g, and the protruding portion 60 abuts against a distal end of the attaching wall portion 12i. Also, on the lower side of the base member 22, the hook portion 52 is hooked on the attaching edge portion 12h of the recessed portion 12b, and the elastic claw portions 53 are engaged with the attaching edge portion 12h.

Now, the detailed process of attaching the operation member 20 and the base member 22 will be described. A worker inserts the operating portion 36 of the operation member 20 into the attaching hole 12a from the back side of the outer member 12 and then hooks and positions the hook portion 52 on the attaching edge portion 12h. At the same time as hooking of the hook portion 52, the pair of elastic claw portions 53 bends and passes around the attaching edge portion 12h and then is restored and engaged with the attaching edge portion 12h.

Subsequently, the worker rotates the base member 22 about the hook portion 52, so that the pair of locking claw portions 54 are pushed onto the edges of the engaging holes 12g and thus the pair of locking claw portions 54 are bent. Once the pair of locking claw portions 54 pass around the attaching wall portion 12i and enter the engaging holes 12g, the pair of locking claw portions 54 are engaged with the edge of the engaging holes 12 due to a restoration force thereof, and as a result the base member 20 is attached to the attaching hole 12a of the outer member 12.

In this way, the attaching operation can be completed by hooking and positioning the hook portion 52 and then pushing the locking claw portions 54 into the engaging holes 12g. Therefore, the attaching operation can be easily performed as compared with fixation using screws or the like. Also, since the lock device 10 can be attached to the outer member 12 from the back side thereof, a possibility of damaging a design surface on the front side of the outer member 12 during the attaching process can be reduced.

Figure 6:
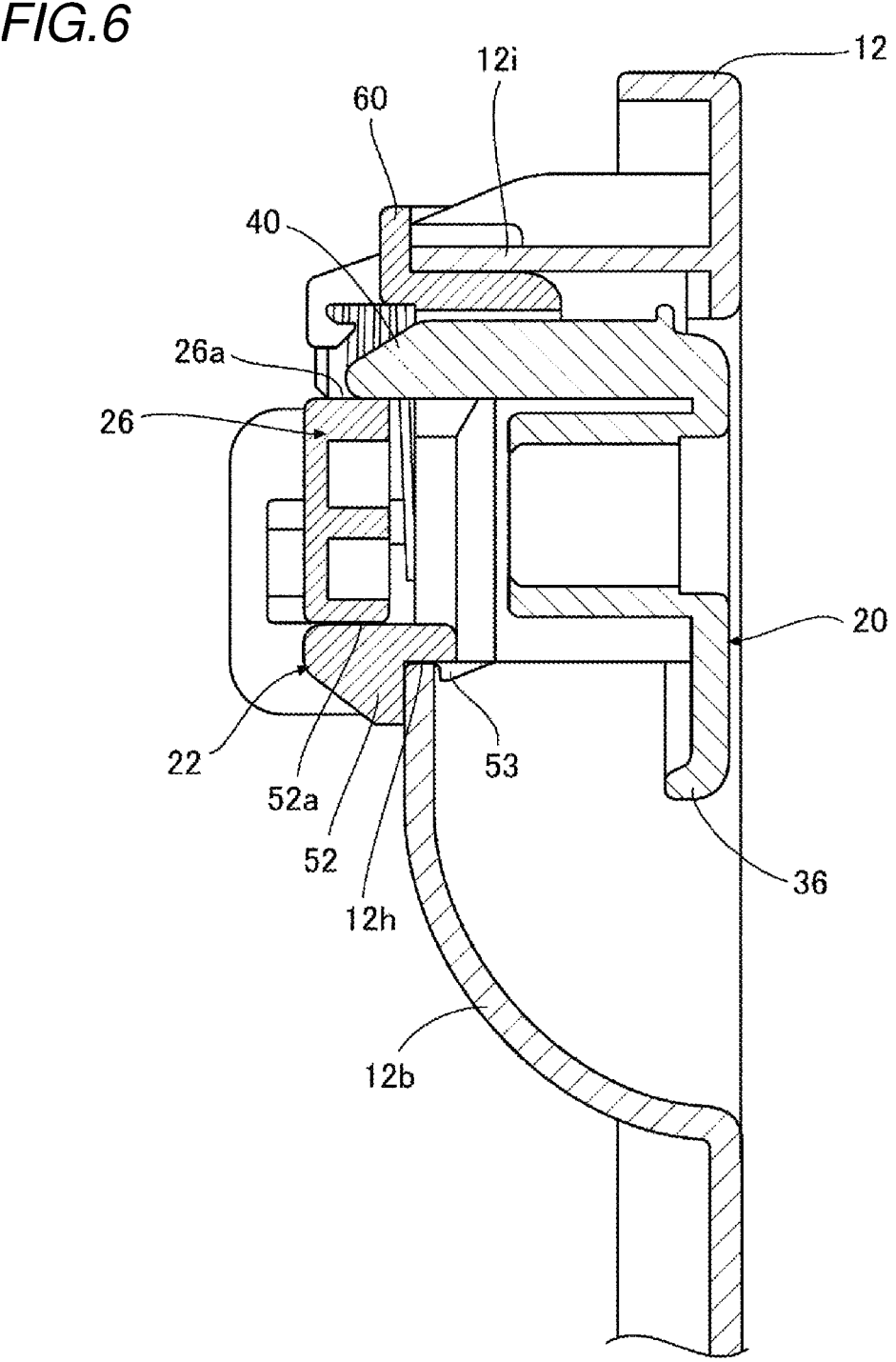
FIG. 6 is a C-C sectional view of the lock device and the outer member shown in FIG. 1B.
Figure 7:
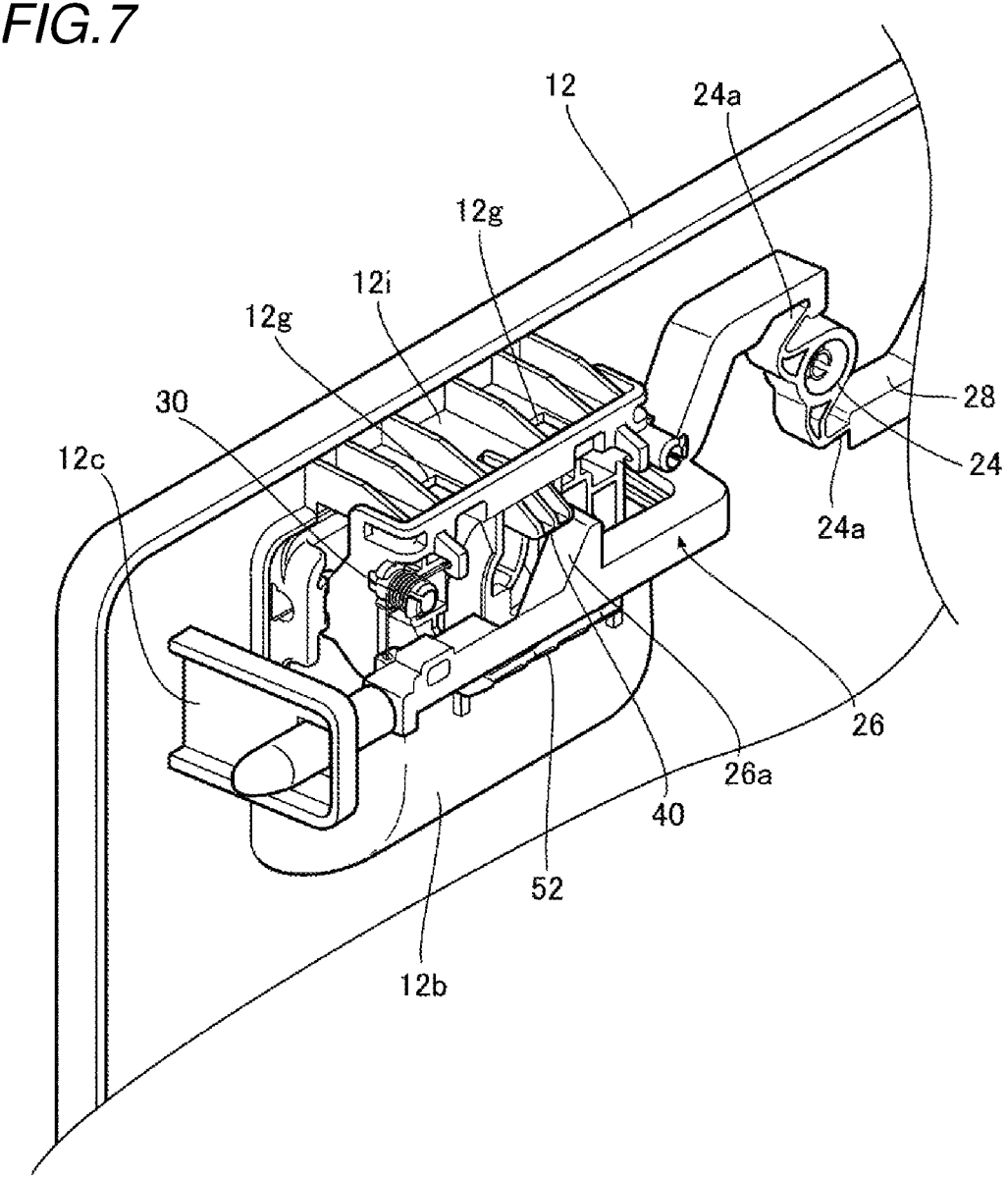
FIG. 7 is an enlarged perspective view showing the lock device attached to the outer member.

FIG. 6 is a C-C sectional view of the lock device 10 and the outer member 12 shown in FIG. 1B. Also, FIG. 7 is an enlarged perspective view showing the lock device 10 attached to the outer member 12. FIGS. 6 and 7 show a locked state of the lock device 10, in which a user is not operating the operation member 20.

The hook portion 52 is arranged such that a distal end thereof extends downward along the recessed portion 12b from the attaching edge portion 12h on the back side of the recessed portion 12b. Therefore, a sufficient margin for hooking to the attaching edge portion 12h is ensured.

As shown in FIGS. 6 and 7, in the lock device 10 in a free state and a locked state, the transmission portion 40 is positioned above the inclined surface 26a of the first rod 26 and is in contact with or close to the inclined surface 26a. Also, the raised portion 52a of the hook portion 52 is arranged below the first rod 26. The first rod 26 is arranged between the transmission portion 40 and the hook portion 52. That is, the transmission portion 40 and the hook portion 52 are positioned to oppose each other across the rod. The first rod 26 is in contact with or close to the raised portion 52a of the hook portion 52, thereby restricting the first rod 26 from moving downward.

Figure 8:
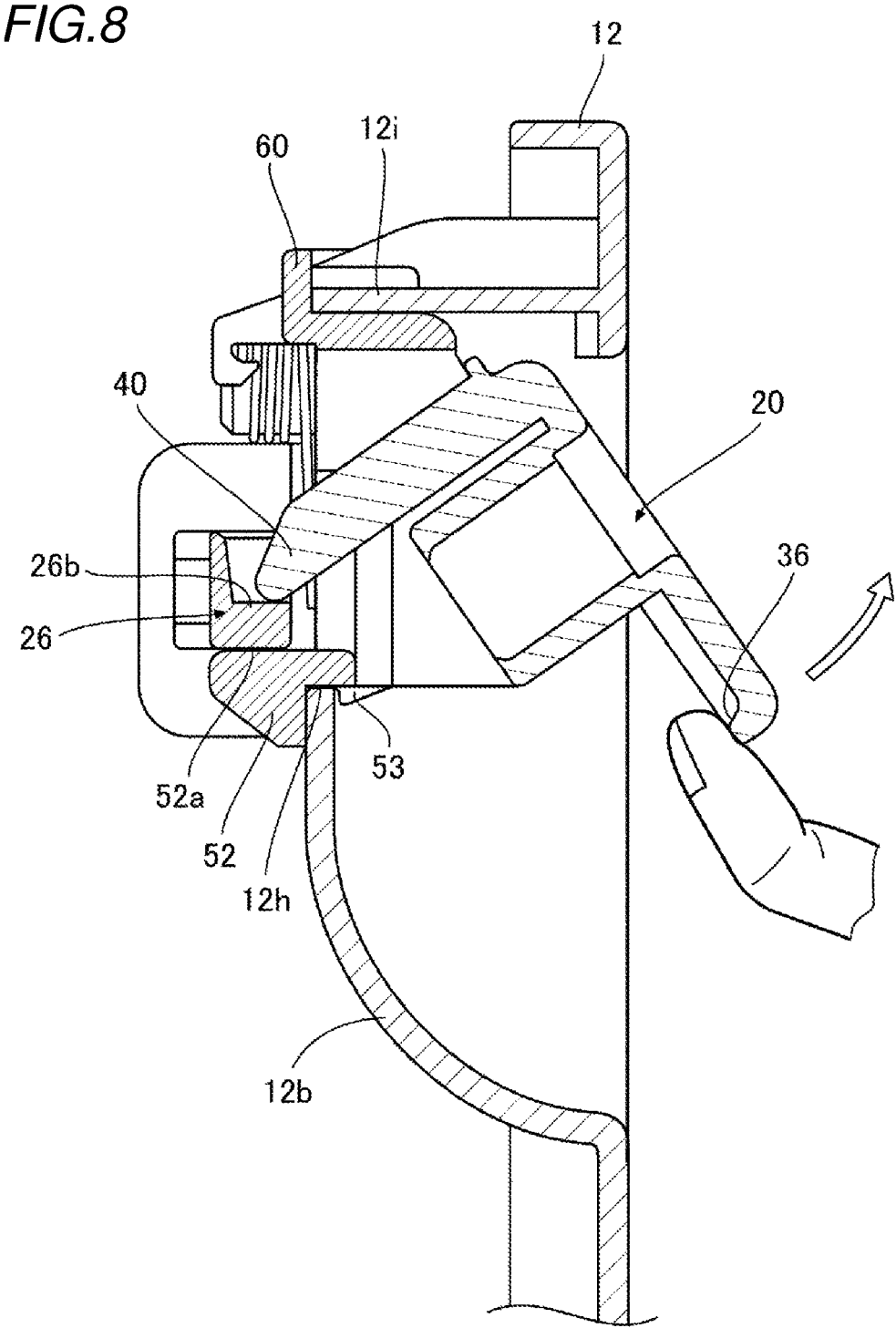
FIG. 8 is a view explaining the lock device in an unlocked state.

FIG. 8 is a view explaining the lock device 10 in an unlocked state. When unlocking thereof, a user performs an operation of inserting a finger into the recessed portion 12b, hooking the finger on the operating portion 36 of the operation member 20 and then pulling the operating portion 36 forward. The operation member 20 is rotated by the operation of the user, and in turn, the transmission portion 40 is moved downward.

As the transmission portion 40 is moved downward, the transmission portion 40 pushes the inclined surface 26a, thereby causing the first rod 26 to move backward. At this time, an operating force from the transmission portion 40 is constituted of a component in a downward direction and a component in a backward movement direction of the first rod 26 due to the inclined surface 26a. The component in the downward direction is likely to cause rattling or bending of the first rod 26. In addition, if the first rod 26 is bent downward, there is a risk that the distal end of the first rod 26 will not easily enter the lock hole of the glove box.

The hook portion 52 is positioned below the first rod 26 to be in contact with or close to the first rod 26, thereby restricting the first rod 26 from moving downward. Accordingly, it is possible to inhibit bending of the first rod 26. Therefore, the hook portion 52 can function as a slide guide for the first rod 26, thereby allowing the first rod 26 to smoothly move forward and backward. The downward movement of the first rod 26 is a movement in a direction intersecting with the forward and backward movement direction of the first rod 26 and also a movement perpendicular to the forward and backward movement direction of the first rod 26. Also, when the hook portion 52 is pressed downward by the operating force from the transmission portion 40 via the first rod 26, the hook portion 52 acts to bite on the attaching edge portion 12h, thereby enhancing a load bearing property.

FIG. 8 shows a state where the operation member 20 is rotated up to the limit, i.e., a state where the first rod 26 is moved backward up to a backmost position. At this time, the transmission portion 40 abuts against the bearing surface 26b of the first rod 26. At this time, the hook portion 52 is pressed against the attaching edge portion 12h due to the operating force exerted thereon from the transmission portion 40 via the first rod 26. In this way, since the hook portion 52 acts to bite on the attaching edge portion 12h, the hook portion 52 is not dislocated even if the user pulls the operation member 20 with a large force, thereby enhancing the load bearing property.

In the case where the lock device 10 is entirely attached to the outer member 12 from the back side thereof, the base member 22 does not easily fall out of the attaching hole 12a toward the front side thereof and thus has a very high load-bearing property. However, it is preferable that a load-bearing property against falling out of the attaching hole 12a toward the back side is also enhanced. Since the hook portion 52 and the elastic claw portions 53 act to bite on the attaching edge portion 12h, the hook portion 52 and the elastic claw portions 53 are not dislocated even if the operation member 20 is operated, thereby enhancing the load-bearing property.

Further, since the bearing surface 26b extends along the forward and backward movement direction of the first rod 26, the operating force from the transmission portion 40 is not dispersed in the forward and backward movement direction of the first rod 26, but transmitted to the hook portion 52 through the first rod 26. Therefore, the hook portion 52 can act to further bite on the attaching edge portion 12h, thereby further enhancing the load-bearing property of the lock device 10.

The present invention is not limited to the foregoing embodiments, and accordingly various modifications, such as design changes, can be made to each of the embodiments based on knowledge of those skilled in the art. Such modifications are intended to be encompassed within the scope of the present invention.

Although an aspect, in which the first rod 26 and the second rod 28 are engaged in the lock holes of the fixed member, has been described with respect to the lock device 10 of the foregoing embodiments, the present invention is not limited to the aspect. For example, the first rod 26 and the second rod 28 may be engaged with protrusions or recesses of the fixed member and also may be engaged with edges of a wall of the fixed member. That is, it is sufficient if surfaces to be engaged with the first rod 26 and the second rod 28 exist on the fixed member. Such portions to be engaged with the first rod 26 and the second rod 28 will be referred to as locked portions of the fixed member.

In addition, although an aspect, in which the hook portion 52 is hooked in the attaching hole 12a of the outer member 12, has been described with respect to the lock device 10 of the foregoing embodiments, the present invention is not limited to the aspect. For example, instead of the attaching hole 12a, an attaching edge portion may be formed to allow the hook portion 52 to be hooked on the back side of the outer member 12.

Further, although an aspect, in which the transmission portion 40 stops by bumping against the bearding surface 26b when the transmission portion 40 moves downward to the maximum limit, i.e., when an operation of pulling the operation member 20 to the maximum limit is performed, has been described in the foregoing embodiments, the present invention is not limited to the aspect. For example, even if the operation member 20 is operated to the maximum limit, the transmission portion 40 may not bump against the bearing surface 26b, but stop in the middle of the inclined surface 26a to abut against the inclined surface 26a.

DESCRIPTION OF REFERENCE NUMERALS

10 Lock Device, 12 Outer Member, 12a Attaching Hole, 12b Recessed Portion, 12c First Support Hole Portion, 12d Second Support Hole Portion, 12e Spring Holding Portion, 12f Rotor Bearing Portion, 12g Engaging Hole, 12h Attaching Edge Portion, 12i Attaching Wall Portion, 12j Protrusion, 20 Operation Member, 22 Base Member, 24 Rotation Member, 24a Hinge Portion, 26 First Rod, 26a Inclined Surface, 26b Bearing Surface, 26c Spring Bearing Portion, 28 Second Rod, 30 First Spring Member, 32 Second Spring Member, 35 Base Portion, 36 Operating Portion, 38 Shaft Hole Portion, 40 Transmission Portion, 42 Side Wall Portion, 44 Middle Wall Portion, 46 Key Cylinder Hole Portion, 48 Base Frame Portion, 50 Insertion Portion, 52 Hook Portion, 52a Raised Portion, 53 Elastic Claw Portion, 54 Locking Claw Portion, 56 Shaft Portion, 58 Upper Wall Portion, 60 Protruding Portion, 62 Spring Bearing Portion.

INDUSTRIAL APPLICABILITY

The present invention relates to a lock device configured to be attached to an opening/closing member.

The invention claimed is:

1. A lock device for holding an opening/closing member in a locked state, the opening/closing member attached to an opening portion of a fixed member in an openable and closable manner, the lock device comprising:
   a base member fixed on the opening/closing member;
   an operation member rotatably supported on the base member; and
   a rod configured to move forward and backward to be engaged with and disengaged from a locked portion of the fixed member in response to operation of the operation member,
   wherein the operation member comprises:
      a pivot portion pivotally supported on the base member; and
      a transmission portion configured to move in a direction intersecting with a forward and backward movement direction of the rod in response to rotation of the operation member,
   wherein the rod has an inclined surface inclined with respect to the forward and backward movement direction of the rod and configured to abut against the transmission portion,
   wherein the base member comprises:
      a first attachment portion formed into a hook shape and configured to be hooked on an attaching edge portion provided on the opening/closing member; and
      a second attachment portion configured to be attached to the opening/closing member, and
   wherein the first attachment portion is arranged to be in contact with or close to a side surface of the rod, wherein when the transmission portion presses the inclined surface due to operation of the operation member and thus causes the rod to move backward, the first attachment portion abuts against the rod, thereby limiting movement of the rod in the direction intersecting with the forward and backward movement direction of the rod.

2. The lock device according to claim 1, wherein the first attachment portion and the transmission portion are positioned to oppose each other across the rod.

3. The lock device according to claim 1,
wherein the rod has a bearing surface extending along the forward and backward movement direction of the rod,
wherein when the rod is moved backward up to a backmost position due to operation of the operation member, the transmission portion abuts against the bearing surface to press the rod against the first attachment portion.

\* \* \* \* \*